(12) United States Patent
Takagi

(10) Patent No.: US 7,773,818 B2
(45) Date of Patent: Aug. 10, 2010

(54) DIGITAL VIDEO RECORDING DEVICE TO BE CONNECTED TO A DIGITAL VIDEO SIGNAL OUTPUT DEVICE VIA AN IEEE 1394 SERIAL BUS

(75) Inventor: Atsushi Takagi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1322 days.

(21) Appl. No.: 11/259,030

(22) Filed: Oct. 27, 2005

(65) Prior Publication Data
US 2006/0098954 A1 May 11, 2006

(30) Foreign Application Priority Data
Oct. 27, 2004 (JP) .............................. 2004-312127

(51) Int. Cl.
G06K 9/46 (2006.01)
H04N 7/26 (2006.01)
H04N 11/02 (2006.01)

(52) U.S. Cl. ................... 382/236; 386/124; 375/240.26

(58) Field of Classification Search ................. 382/100, 382/232, 236, 282, 284, 309; 386/124–125; 375/240.26
See application file for complete search history.

(56) References Cited

U.S. PATENT DOCUMENTS

| 7,474,359 B2 * | 1/2009 | Sullivan et al. ............. 348/731 |
| 2002/0019833 A1 | 2/2002 | Hanamoto |
| 2004/0070689 A1 * | 4/2004 | Mochizuki et al. ............ 348/552 |
| 2006/0146165 A1 * | 7/2006 | Hagiwara et al. ........ 348/333.01 |

FOREIGN PATENT DOCUMENTS

| JP | 2-249377 A | 5/1990 |
| JP | 2002-142188 A | 5/2002 |
| JP | 2003-59244 A | 2/2003 |
| JP | 2003-069944 A | 3/2003 |
| JP | 2004-62743 A | 2/2004 |

OTHER PUBLICATIONS

Japanese Office Action dated Nov. 30, 2006 including English translation (five (5) pages).
Japanese Office Action dated Feb. 26, 2007 with English translation (Six (6) pages).

* cited by examiner

Primary Examiner—Daniel G Mariam
(74) Attorney, Agent, or Firm—Crowell & Moring LLP

(57) ABSTRACT

A DVD recorder connected to a DV camera via an IEEE 1394 serial bus comprises: an image selector for selecting a moving image, as a candidate image for an opening/ending screen, from moving images contained in stream data received from the camera; a moving image extractor for extracting the selected moving image from the moving images; a storage unit for temporarily storing the extracted moving image; an image converter for converting the stored moving image into a still image; a title screen selector for selecting, from the still images, a still image to be an opening/ending screen for a file of stream data recorded in the recorder; and a data associating unit for associating the selected still image with the file of stream data. This recorder can be more convenient to use, and can reduce the required recording area of a DVD for creating the opening/ending screen.

11 Claims, 2 Drawing Sheets

DIGITAL VIDEO RECORDING DEVICE TO BE CONNECTED TO A DIGITAL VIDEO SIGNAL OUTPUT DEVICE VIA AN IEEE 1394 SERIAL BUS

BACKGROUND OF THE INVENTION

1. Field of the Invention

The present invention relates to a digital video recording device such as a DVD (Digital Versatile Disc) recorder to be connected to a digital video signal output device such as a DV (Digital Video) camera via an IEEE (Institute of Electrical & Electronics Engineers) 1394 serial bus.

2. Description of the Related Art

A conventional digital video recording device such as a DVD recorder to be connected to a digital video signal output device such as a DV camera via an IEEE 1394 serial bus has the following problem.

For example, assume that the digital video recording device is a conventional DVD recorder, and the digital video signal output device connected to the DVD recorder is a DV camera. Further assume that a user wishes to use a moving image photographed or taken by the DV camera as a title screen (image for an opening screen) and/or an ending screen (image for an ending screen) for a file of stream data recorded on a DVD. Under these assumptions, a user is required to first record, onto a DVD in the DVD recorder from a DV tape in the DV camera, stream data containing a moving image to be used for the title screen and/or the ending screen (hereafter sometimes referred to collectively as "opening/ending screen"). The user is then required to reproduce the recorded stream data for the purpose of selecting the moving image to be used for the opening/ending screen.

However, this method always requires the user to record the stream data from the DV tape onto the DVD so as to create an opening/ending screen based on a moving image contained in the stream data recorded on the DV tape. This applies even in the case where the user does not wish to record, onto the DVD, the stream data containing the moving image to be used for the opening/ending screen and view the moving image contained in the stream data. Thus, when an opening/ending screen for a file of stream data recorded on a DVD is to be created on the basis of a moving image contained in the stream data recorded on the DV tape, this method is not only inconvenient to use, but also causes a wasteful use of the recording area of the DVD.

SUMMARY OF THE INVENTION

An object of the present invention is to provide such a digital video recording device that is to be connected to a digital video signal output device via an IEEE 1394 serial bus, and that can be more convenient to use, and can reduce the required recording area of a digital recording medium (e.g. DVD) in the digital video recording device such as a DVD recorder when creating a title screen and/or an ending screen for a file(s) of stream data recorded on the digital recording medium in the digital video recording device.

According to the present invention, we provide a digital video recording device to be connected to a digital video signal output device via an IEEE (Institute of Electrical & Electronics Engineers) 1394 serial bus, the digital video recording device comprising: an operation means for commanding and operating the digital video signal output device and the digital video recording device itself; an IEEE 1394 interface for sending and receiving a control command signal and its response signal, and also sending and receiving stream data, to and from the digital video signal output device; a video recording means for recording, on a digital recording medium, stream data received from the digital video signal output device via the IEEE 1394 interface; an image selection means for selecting a moving image from moving images contained in the stream data received from the digital signal output device via the IEEE 1394 interface, in which the selected moving image is to be used for a candidate image for a title screen and/or an ending screen; a moving image extracting means for extracting the moving image, selected by the image selection means, from the moving images contained in the stream data received from the digital signal output device via the IEEE 1394 interface; a storage means for temporarily storing the moving image extracted by the moving image extracting means; an image converting means for converting the moving image stored in the storage means into a still image; a title screen selection means for selecting, from the still images generated by the conversion by the image converting means, a still image to be a title screen and/or an ending screen for a file of stream data recorded by the video recording means; and a data associating means for associating the still image selected by the title screen selection means with the file of stream data recorded by the video recording means.

The digital video recording device according to the present invention extracts a moving image (to be used for a candidate image for a title screen and/or an ending screen) from moving images contained in stream data received from the digital video signal output device via the IEEE 1394 interface. Thus, for the purpose of extracting a candidate image for a title screen and/or an ending screen, the digital video recording device according to the present invention makes it unnecessary to first record, on the digital recording medium of the digital video recording device, stream data received from the digital video signal output device.

This is in contrast to the conventional digital video recording device which first records, on the digital recording medium thereof, stream data received from the digital signal output device for the purpose of extracting a candidate image for a title screen and/or an ending screen from moving images contained in the stream data recorded on the digital recording medium. Accordingly, the digital video recording device of the present invention is more convenient to use than the conventional one when creating a title screen and/or an ending screen. Furthermore, the digital video recording device of the present invention can reduce the required recording area in the digital recording medium thereof when creating a title screen and/or an ending screen, as compared with the conventional one that first records, on the digital recording medium thereof, stream data received from the digital signal output device.

Preferably, the moving image extracting means extracts, as the moving image selected by the image selection means, a moving image whose reception from the digital video signal output device is completed the moment the selection is made using the image selection means.

Further preferably, the digital video recording device further comprises a still image storing means for storing the still images generated by the conversion by the image converting means, wherein the title screen selection means is used for selecting, from the still images stored in the still image storing means, the still image to be the title screen and/or the ending screen for the file of stream data recorded by the video recording means. The digital video recording device according to the further preferable mode can reduce the required recording area in the digital recording medium thereof when creating a title screen and/or an ending screen as compared with a digital video recording device which records, on a digital recording medium such as a DVD, still images generated by conversion by an image converting means.

Here, the digital video signal output device to be connected to the digital recording device via the IEEE 1394 serial bus can be a digital video camera. Further, the digital video recording device can be a digital versatile disc recorder.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Embodiments of the present invention, as best mode for carrying out the invention, will be described hereinafter with reference to the drawings. The present invention relates to a digital video recording device such as a DVD (Digital Versatile Disc) recorder to be connected to a digital video signal output device such as a DV (Digital Video) camera via an IEEE (Institute of Electrical & Electronics Engineers) 1394 serial bus. The following embodiments describe examples in which the present invention is applied to a DVD recorder as the digital video recording device. It is to be understood that the embodiments described herein are not intended as limiting, or encompassing the entire scope of, the invention.

Figure 1:
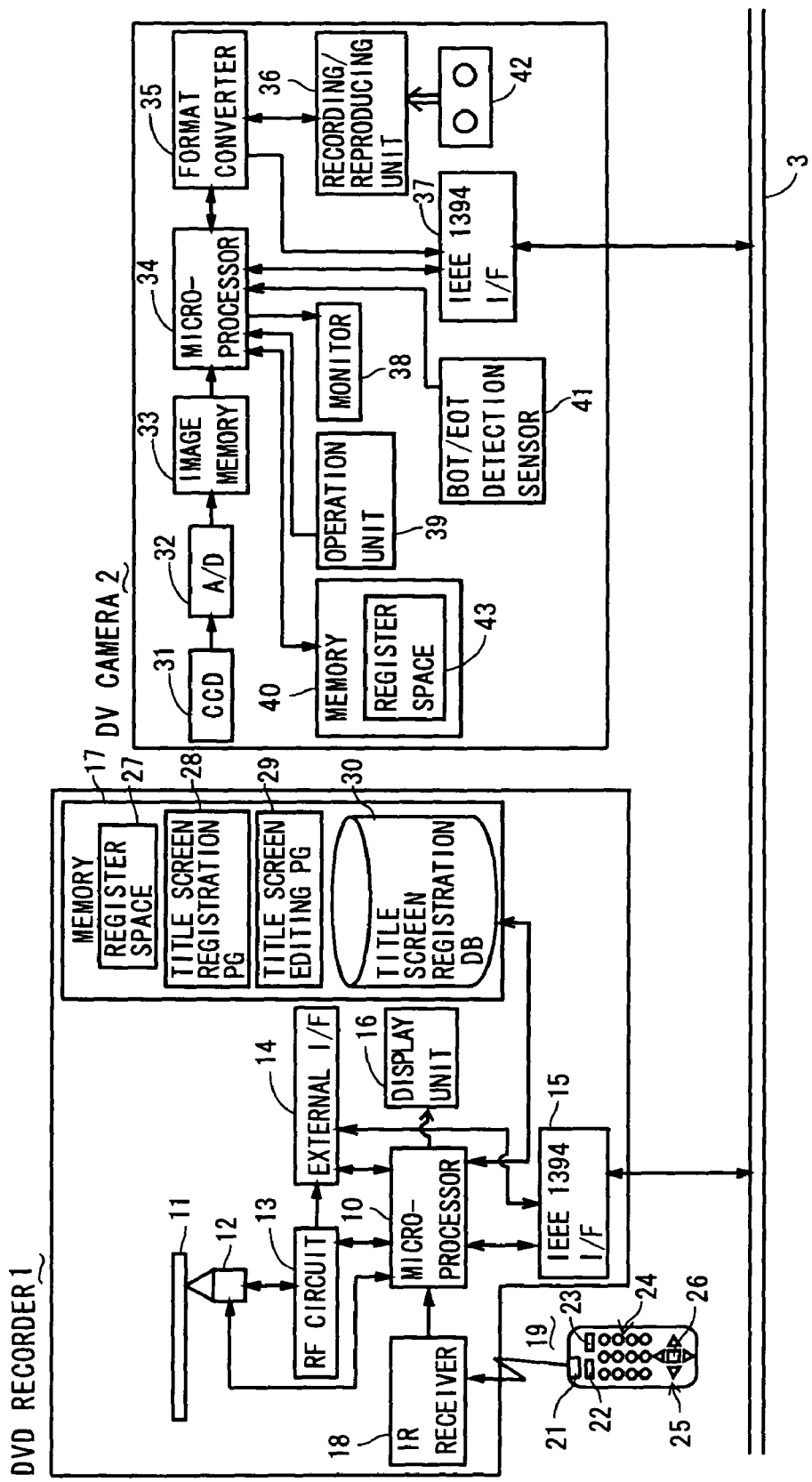
FIG. 1 is a schematic electrical block diagram of a DVD recorder as a digital video recording device according to an embodiment of the present invention as well as a DV camera connected to the DVD recorder.

FIG. 1 shows a schematic electrical block diagram of a DVD recorder 1 as a digital video recording device according to an embodiment of the present invention as well as a DV camera 2 connected to the DVD recorder 1 via an IEEE 1394 serial bus (hereafter referred to simply as "bus") 3. The DVD recorder 1 is connected to the DV camera 2 via the bus 3, and is capable of recording stream data (photographed or taken data), received from the DV camera 2, on a DVD-RAM (Random Access Memory) 11 as a digital recording medium. The DVD recorder 1 comprises a microprocessor 10 which controls respective units and elements of the DVD recorder 1, and which serves as a moving image extracting means, an image converting means and a data associating means as will be apparent from later descriptions.

The DVD recorder 1 further comprises: an optical pickup 12 (video recording means) for irradiating a light beam onto the DVD-RAM 11 to record and reproduce data under the control of the microprocessor 10; an RF (radio frequency) circuit 13 for processing an RF signal output from the optical pickup 12; an external interface 14 for e.g. converting data format for inputting and outputting data to and from an external input/output device; an IEEE 1394 interface (hereafter referred to as IEEE 1394 I/F) 15; a display unit 16 for displaying various messages; and a memory (claimed storage means and still image storing means) 17 for storing data such as various data and programs. The IEEE 1394 I/F 15 is provided to send and receive a control command signal and its response signal, and also send and receive stream data such as photographed or taken data, to and from an external input/output device such as the DV camera 2 via the bus 3.

The memory 17 stores: a register space 27 for storing various information on its own node (DVD recorder 1) and other nodes (e.g. DV camera 2) on the bus 3; a title screen registration program (PG) 28 which is a program for registering candidate images for a title screen (image for an opening screen) and/or an ending screen (image for an ending screen), the candidate images being still images created on the basis of moving images contained in stream data received from the DV camera 2; a title screen editing program (PG) 29 which is a program for associating the title screen and/or the ending screen (hereafter often referred to collectively as "opening/ending screen(s)") with a file(s) of stream data recorded on the DVD-RAM 11; and a title screen registration database (DB) 30 for storing the registered opening/ending screen(s). The DVD recorder 1 furthermore comprises an infrared signal receiving unit (IR receiver) 18 for receiving an infrared signal sent from a remote control 19 which serves as an operation means, an image selection means and a title screen selection means. The remote control 19 has an infrared signal sending unit 21 and a key unit 24 having various keys. The keys of the key unit 24 include numeric input keys, and additionally, a menu key 22, a power supply key 23, cursor keys 25 and a decision key 26.

On the other hand, the DV camera 2 is a DV camera with a built-in VCR (Video Cassette Recorder), and comprises: an IEEE 1394 interface 37 (hereafter referred to as "IEEE 1394 I/F"); a CCD (Charge Coupled Device) 31 for outputting an image of a photographed object in the form of analog signal; an A/D. (Analog-to-Digital) converter 32 for converting an analog signal output from the CCD 31 to a digital signal; an image memory 33 for temporarily storing image data sent from the A/D converter 32; a microprocessor 34 for subjecting the image data stored in the image memory 33 to various image processing; a format conversion circuit (format converter) 35; and a recording/reproducing unit 36. The format conversion circuit 35 converts, into a data stream, the format of the image data subjected to the image processing by the microprocessor 34. The recording/reproducing unit 36 writes, to a DV tape 42, stream data output from the format conversion circuit 35, and reproduces stream data (photographed data) recorded on the DV tape 42. The DV camera 2 further comprises: a liquid crystal monitor (monitor) 38 for displaying images sent from the microprocessor 34; an operation unit 39; a memory 40 for storing various data; and a BOT (beginning-of-tape)/EOT (end-of-tape) detection sensor 41 for detecting beginning and end of the DV tape 42. The memory 40 stores a register space 43 for storing various information on its own node (DV camera 2) and other nodes (e.g. DVD recorder 1) on the bus 3.

Figure 2:
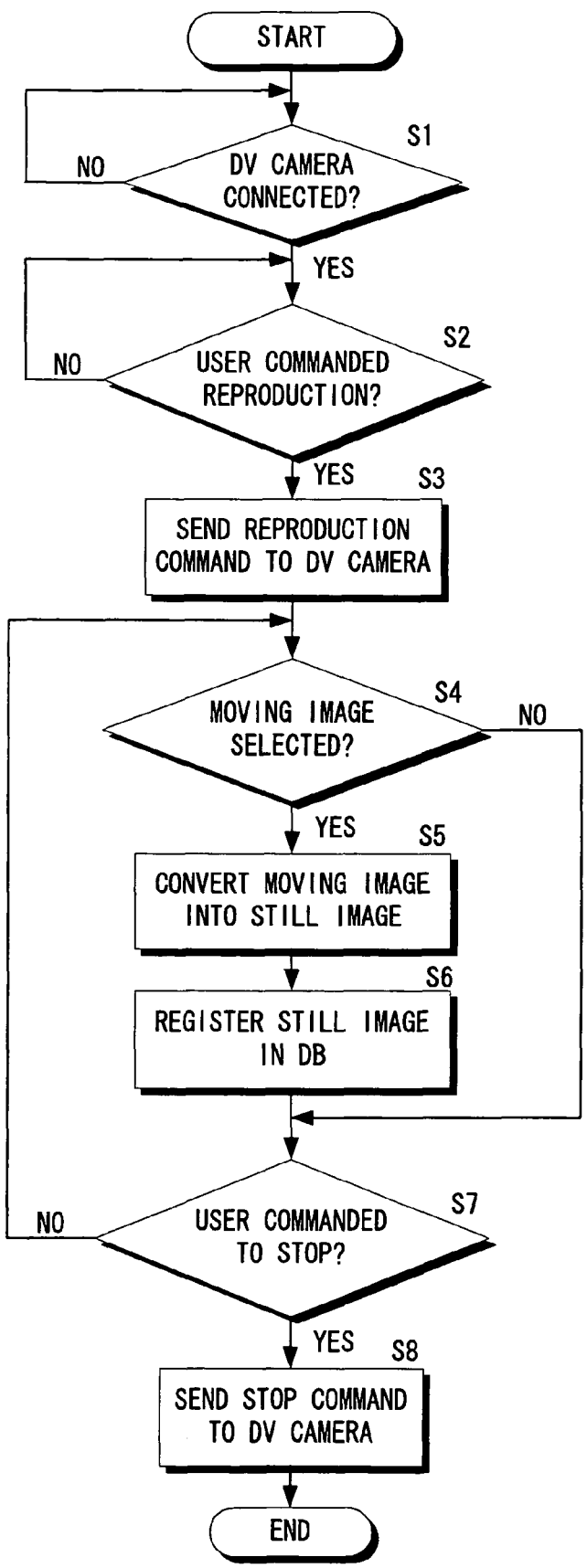
FIG. 2 is a flow chart showing a process in the DVD recorder for registering a candidate image for an opening/ending screen created on the basis of stream data received from the DV camera.

Referring now to the flow chart of FIG. 2, the following describes a process in the DVD recorder 1 for registering a candidate image for an opening/ending screen created on the basis of stream data received from the DV camera 2. When a user sets, in a DV camera 2, a DV tape 42 having recorded thereon stream data containing moving images to be used for a candidate image for an opening/ending screen, and then connects the DV camera 2 to the DVD recorder 1 via the bus 3 (YES in S1), the microprocessor 10 of the DVD recorder 1 repeatedly determines whether the user, using the remote control 19, has commanded the DV camera 2 to reproduce images recorded on the DV tape 42 (S2). When the microprocessor 10 of the DVD recorder 1 detects the command by the user for the reproduction (YES in S2), the microprocessor 10 sends a reproduction command to the DV camera 2 (S3) so as to command the DV camera 2 to reproduce stream data recorded on the DV tape 42, and further command the IEEE 1394 I/F 15 to start receiving the reproduced stream data from the DV camera 2.

The user next views images reproduced and displayed on e.g. the liquid crystal monitor 38 of the DV camera 2. When the user operates the remote control 19 to select, from the reproduced images, a moving image to be used for a candidate image for an opening/ending screen (YES in S4) referring to the displayed images, the microprocessor 10 of the DVD recorder 1 extracts the moving image selected in the step S4 from the moving images contained in the stream data received from the DV camera 2 via the IEEE 1394 I/F 15. The thus selected and extracted moving image is such a moving image that the IEEE 1394 I/F 15 under the control of the microprocessor 10 completes receiving from the DV camera 2 the moment the user selects using the remote control 19. Putting it in another way, the microprocessor 10 (moving image extracting means) extracts, as a moving image selected by the remote control 19 (image selection means), a moving image whose reception from the DV camera 2 is completed the moment the selection is made using the remote control 19. The microprocessor 10 temporarily stores the thus selected and extracted moving image in the memory 17. Further, the microprocessor 10 converts this moving image into a still image(s) (S5), and registers the thus obtained images, generated by the conversion, in the title screen registration DB 30 (database) 30 in the memory 17 as a candidate image for an opening/ending screen (S6).

The microprocessor 10 of the DVD recorder 1 repeats the steps S4 to S6 until the user, using the remote control 19, commands the DV camera 2 to stop (NO in S7). When the microprocessor 10 detects that the user, using the remote control 19, has commanded the DV camera 2 to stop (YES in S7), the microprocessor 10 sends a stop command to the DV camera 2 (S8) so as to stop the DV camera 2.

Thereafter, the user, using the remote control 19, sends a command to command the microprocessor 10 to associate the candidate image for the opening/ending screen (as registered in the title screen registration DB 30 in the memory 17 as above) with a file of a stream data which is recorded on the DVD-RAM 11, and with which the user wishes to associate the candidate image. In response to this command and using the title screen editing PG 29, the microprocessor 10 incorporates the candidate image for the opening/ending screen in, and thereby associate the candidate image for the opening/ending screen with, the file of the stream data recorded on the DVD-RAM 11 according to the wish of the user.

As described in the foregoing, the DVD recorder 1 according to the present embodiment extracts a moving image (to be used for a candidate image for an opening/ending screen) from moving images contained in stream data received from the DV camera 2 via the IEEE 1394 I/F 15, not from moving images contained in stream data recorded on the DVD-RAM 11. Thus, for the purpose of extracting a candidate image for an opening/ending screen, the DVD recorder 1 according to the present embodiment makes it unnecessary to first record (dub), on the DVD-RAM 11, stream data recorded on the DV tape 42. This is in contrast to the conventional DVD recorder which first records (dubs), on the DVD-RAM 11, stream data recorded on the DV tape 42 for the purpose of extracting a candidate image for an opening/ending screen from moving images contained in the stream data recorded on the DVD-RAM 11. Accordingly, the DVD recorder 1 is more convenient to use than the conventional one when creating an opening/ending screen. Furthermore, since it is not necessary for the DVD recorder 1 to record stream data from the DV tape 42 on the DVD-RAM 11, the DVD recorder 1 can reduce the required recording area in the DVD-RAM 11 when creating an opening/ending screen.

It is to be noted that the present invention is not limited to the above-described embodiments, and various modifications are possible. For example, the DVD recorder 1 according to the embodiment as described above extracts such a moving image that the DVD recorder 1 (IEEE 1394 I/F 15 under the control of the microprocessor 10) completes receiving from the DV camera 2 the moment the user selects using the remote control 19. Based on the thus extracted moving image, the DVD recorder 1 creates a candidate image for an opening/ending screen. However, the present invention is not limited thereto, i.e. not limited to a moving image whose reception from the DV camera 2 is completed the moment the user selects using the remote control 19. For example, it is possible that the DVD recorder 1 creates a candidate image for an opening/ending screen for registration, based on a moving image which the DVD recorder 1 completes receiving from the DV camera 2 one second or 0.5 second before or 0.5 second after the moment the user selects using the remote control 19. Furthermore, the opening/ending screen can be one still image, or can be multiple still images which are created on the basis of, and by intermittently dropping multiple frames of, a moving image received from the DV camera 2 during several seconds spanning before and after the moment the user selects using the remote control 19, in order to display the multiple still images like an animation with intermittent motion.

Further, the above embodiment shows the case in which the present invention has been applied to a DVD recorder which can read from and write to a DVD-RAM. However, the DVD recorder to which the present invention can be applied is not limited thereto. The DVD recorder can be e.g. one which can read from and write to a DVD-R (Recordable) or a DVD-RW (Rewritable). Furthermore, the above embodiment shows the case where a moving image to be used for a candidate image for an opening/ending screen is extracted from moving images contained in stream data recorded on a DV tape. However, it is possible to mount an SD (Secure Digital) card in a DV camera so that a moving image to be used for a candidate image for an opening/ending screen is extracted from moving images contained in stream data recorded on the SD card. Moreover, the digital video recording device to which the present invention can be applied is not limited to a DVD recorder, but can be others such as an HDD (Hard Disk Drive) recorder. In addition, the DV camera is not the only device capable of sending, to a digital video recording device of the present invention, stream data containing moving images to be used for a candidate image for an opening/ending screen. Instead of the DV camera, it is also possible to use another digital video signal output device such as a DVD recorder, an HDD recorder, a tuner or a digital television receiver.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2004-312127 filed Oct. 27, 2004, the contents of which are hereby incorporated by reference.

What is claimed is:

1. A digital video recording device to be connected to a digital video signal output device via an IEEE (Institute of Electrical & Electronics Engineers) 1394 serial bus, the digital video recording device comprising:
    an operation means for commanding and operating the digital video signal output device and the digital video recording device itself;
    an IEEE 1394 interface for sending and receiving a control command signal and its response signal, and also sending and receiving stream data, to and from the digital video signal output device;
    a video recording means for recording, on a digital recording medium, stream data received from the digital video signal output device via the IEEE 1394 interface;
    an image selection means for selecting a moving image from moving images contained in the stream data received from the digital signal output device via the IEEE 1394 interface, in which the selected moving image is to be used for a candidate image for a title screen and/or an ending screen;
    a moving image extracting means for extracting the moving image, selected by the image selection means, from the moving images contained in the stream data received from the digital signal output device via the IEEE 1394 interface;
    a storage means for temporarily storing the moving image extracted by the moving image extracting means;
    an image converting means for converting the moving image stored in the storage means into a still image;
    a title screen selection means for selecting, from one or more still images generated by the conversion by the image converting means, a still image to be a title screen and/or an ending screen for a file of stream data recorded by the video recording means; and
    a data associating means for associating the still image selected by the title screen selection means with the file of stream data recorded by the video recording means.

2. The digital video recording device according to claim 1, wherein the moving image extracting means extracts, as the moving image selected by the image selection means, a moving image whose reception from the digital video signal output device is completed the moment the selection is made using the image selection means.

3. The digital video recording device according to claim 2, which further comprises a still image storing means for storing the still images generated by the conversion by the image converting means,
    wherein the title screen selection means is used for selecting, from the still images stored in the still image storing means, the still image to be the title screen and/or the ending screen for the file of stream data recorded by the video recording means.

4. The digital video recording device according to claim 3, wherein the digital video signal output device to be connected to the digital recording device via the IEEE 1394 serial bus is a digital video camera.

5. The digital video recording device according to claim 4, which is a digital versatile disc recorder.

6. The digital video recording device according to claim 3, which is a digital versatile disc recorder.

7. The digital video recording device according to claim 2, wherein the digital video signal output device to be connected to the digital recording device via the IEEE 1394 serial bus is a digital video camera.

8. The digital video recording device according to claim 2, which is a digital versatile disc recorder.

9. The digital video recording device according to claim 1, which further comprises a still image storing means for storing the still images generated by the conversion by the image converting means,
    wherein the title screen selection means is used for selecting, from the still images stored in the still image storing means, the still image to be the title screen and/or the ending screen for the file of stream data recorded by the video recording means.

10. The digital video recording device according to claim 1, wherein the digital video signal output device to be connected to the digital recording device via the IEEE 1394 serial bus is a digital video camera.

11. The digital video recording device according to claim 1, which is a digital versatile disc recorder.

* * * * *